United States Patent [19]

Arai et al.

[11] Patent Number: 4,985,786

[45] Date of Patent: Jan. 15, 1991

[54] APPARATUS FOR RETRIEVING INFORMATION PREVIOUSLY RECORDED ON RECORDING TAPE IRRESPECTIVE OF TAPE SPEED

[75] Inventors: Kazuo Arai; Kiyoshi Ota, both of Hirakata; Kouji Wakiyama, Kadoma, all of Japan

[73] Assignee: Matsushita Electric Industrial Co., Ltd., Osaka, Japan

[21] Appl. No.: 274,815

[22] Filed: Nov. 23, 1988

[30] Foreign Application Priority Data

Nov. 30, 1987 [JP] Japan .................. 62-302228

[51] Int. Cl.$^5$ .................. G11B 5/52; G11B 21/04
[52] U.S. Cl. .................. 360/70; 360/73.05; 360/73.08; 360/72.2
[58] Field of Search .................. 360/8–10.3, 360/18, 27, 32, 64, 73.04, 73.05, 73.08, 73.09–73.14, 70, 77.14, 77.15, 72.1, 72.2

[56] References Cited

U.S. PATENT DOCUMENTS 4,630,142 12/1986 Tani et al. .................. 360/73.12
4,688,115 8/1987 Takahashi et al. .................. 360/70
4,764,824 8/1988 Tani et al. .................. 360/70

Primary Examiner—Aristotelis M. Psitos
Assistant Examiner—Steven R. Garland
Attorney, Agent, or Firm—Wenderoth, Lind & Ponack

[57] ABSTRACT

An information reproducing apparatus quickly retrieves tape position information of a tape-shaped recording medium on which tracks are formed so as to record information and tape position information. This apparatus includes a tape speed detecting unit for continuously detecting the running speed of the tape-shaped recording medium, a cylinder speed setting unit for setting target values of rotation of a rotary cylinder for making constant the component of speed at which the head moves in a track direction according to the output of the tape speed detecting unit, and a cylinder control circuit for controlling the rotary cylinder so as to adapt its rotation to the target value of velocity of the cylinder set by the cylinder speed setting unit. By rotating the cylinder at a rotational speed at which data reproduction can take place at a tape speed obtained by the tape speed detecting unit, the tape position information can be positively read out even in a transient state when the running speed of the recording medium changes.

5 Claims, 3 Drawing Sheets

APPARATUS FOR RETRIEVING INFORMATION PREVIOUSLY RECORDED ON RECORDING TAPE IRRESPECTIVE OF TAPE SPEED

BACKGROUND OF THE INVENTION

1. Field of the Invention

The present invention relates to an information reproducing apparatus for tape recording, such as a digital audio tape recorder (hereinafter referred to as a DAT), a video tape recorder (hereinafter referred to as a VTR), etc. for reproducing information recorded in tracks on a recording medium in the shape of a tape, and particularly to an information reproducing apparatus which can read out a tape position rapidly.

2. Description of the Prior Art

With a DAT, the tape position information is recorded in a predetermined position on each slant track formed on a magnetic tape. A conventional DAT is arranged such that in order to read the tape position rapidly, a rotary cylinder having a head mounted thereon is adapted to vary its speed dependent on the tape speed so that the tape position information can be read out even if the tape runs at a high speed. We have proposed a method in which the speeds of both the tape and rotary cylinder are changed step by step within a limited range of speed change in an attempt to avoid the overlooking of tape position information even during the time when the tape speed changes from low to high (U.S. patent application Ser. No. 076,188 filed July 21, 1987).

However, such a method requires many steps for adjusting the speeds of the magnetic tape and rotary cylinder, and thus requires relatively complicated system control programs for the microcomputer to give speed instructions of speed to the control circuits for controlling the speeds of the magnetic tape and rotary cylinder.

SUMMARY OF THE INVENTION

An object of the present invention is to provide an information reproducing apparatus in which a tape-shaped recording medium is moved at high speed at one step during a transitional period when the tape-shaped medium changes its speed and in which the tape position information on the recording medium can be read out in a reliable manner.

For the purpose of attaining the above-noted object, the information reproducing apparatus of the present invention, wherein a tape-shaped recording medium is used on which information is recorded in slant tracks formed on the tape-shaped recording medium and positional information of the recording medium is recorded in each of the tracks, comprises a reproducing head, a rotary cylinder having said head mounted thereon, a reproducing circuit for reproducing data recorded on said recording medium from the output of said head, two reels around which said recording medium is wound, a high speed tape driving means for moving said recording medium at a higher speed than the speed at the time of recording using said two reels, a tape speed detecting means for continuously detecting the travelling speed of said recording medium, a cylinder speed setting means for setting a target value of the rotational speed of the rotary cylinder for making constant the component of the speed at which the head moves in the direction of said track according to an output of said tape speed detecting means, and a cylinder control circuit for controlling the rotary cylinder so that its rotational speed will be equal to the target value set by said cylinder speed setting means.

If this arrangement is applied to a DAT, for example, even when the speed of the magnetic tape changes from low to high, the component of the speed at which the head runs in the direction of the track is kept constant, and the tape position information on the magnetic tape can be always read out positively. In this connection, if the speed of the magnetic tape is accelerated at a stretch, or decelerated, a positive read-out of tape position information on the magnetic tape can be achieved during the increasing or decreasing of the tape speed. Consequently, no provision of many steps is necessary for adjusting the speed of the magnetic tape and rotary cylinder. This greatly simplifies the system control programs for the microcomputer for issuing speed instructions to the respective control circuits for adjusting the speed of the magnetic tape and rotary cylinder.

DESCRIPTION OF THE PREFERRED EMBODIMENTS

Figure 1:
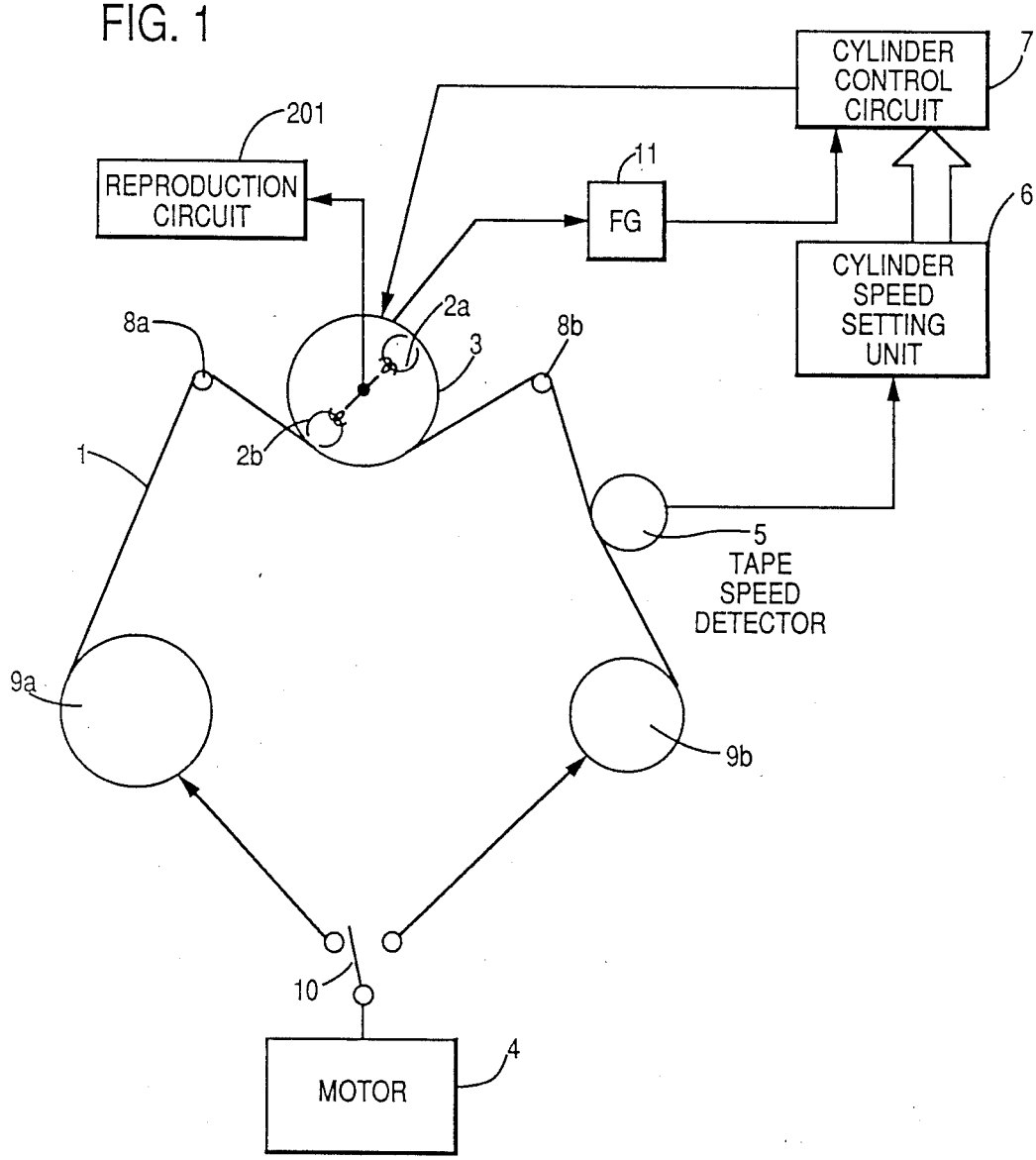
FIG. 1 is a block diagram of a first embodiment of the present invention.

FIG. 1 is a block diagram of a magnetic tape reproducing apparatus in accordance with one embodiment of the present invention.

In the drawing, element 1 designates a magnetic tape, elements 2a and 2b are heads; element 3 is a rotary cylinder on which the heads 2a and 2b are mounted; elements 9a and 9b are reels for taking up the magnetic tape 1; elements 8a and 8b are posts for forming a desired travelling passageway for the magnetic tape 1 by bringing the tape into contact with the rotary cylinder 3; element 4 is a motor for driving the reel 9a or 9b to move the magnetic tape 1 at a high speed; element 10 is a driving force change-over unit for transmitting the driving force of the motor 4 to the reel 9a or 9b; element 5 a tape speed detector for detecting the running speed of the magnetic tape 1, while in contact with the magnetic tape 1, for subsequent outputting thereof; element 6 is a cylinder speed setting unit for setting a desired rotational speed of the rotary cylinder 3 upon receipt of the output from the tape speed detector 5; elements 11 is a for producing output upon detection of the rotational speed of the rotary cylinder 3; element 7 is a cylinder control circuit for rotating the rotary cylinder 3 at a specified rotational speed determined by the cylinder speed setting unit using the output of FG 11, and element 201 is a reproduction circuit for reproducing data supplied from the heads 2a and 2b. Specifically, the driving force change-over unit 10 can be embodied mechanically by a point contact idler. The motor 4 and driving force change-over unit 10 function as a tape rapid driving unit for running the magnetic tape 1 at a higher speed than at the time of recording.

The operation of the embodiment in FIG. 1 will be described. In the drawing, the magnetic tape 1 runs at a high speed as it is taken up by the reel 9a or 9b driven by the motor 4. The running direction of the tape is changed by the driving force change-over unit 10. Then, the tape speed detector 5 is adapted to detect the running speed of the magnetic tape 1, thereby producing a generated voltage or a frequency signal. By utilizing the output of the tape speed detector 5, the cylinder speed setting unit 6 calculates and outputs a desired rotational seed of the rotary cylinder 3. In accordance with instructions from the cylinder speed setting unit 6, the cylinder control circuit 7 acts to control the rotational speed of the rotary cylinder 3 by use of the output of FG 11.

The desired rotational speed of the rotary cylinder 3 set by the cylinder speed setting unit 6 corresponds to a value from which the heads 2a and 2b may discern tape position information on the magnetic tape 1 in a reliable manner. The example of a recording pattern of the magnetic tape 1 as well as the desirable rotational speed of the rotary cylinder 3 will be described in further detail.

Figure 2:
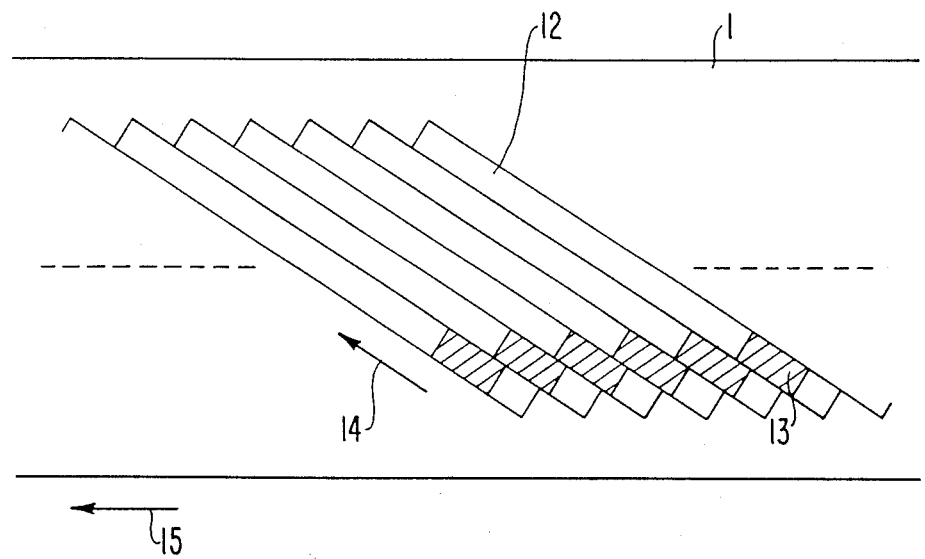
FIG. 2 is a diagram showing an example of a recording pattern of a recording medium for use in the apparatus according to the present invention.

FIG. 2 is a diagram showing an example of a recorded pattern of position information of tape position on the track. In this drawing, elements 12 are tracks on the magnetic tape 1; elements 13 are tape position information areas recorded on the tracks 12; an arrow 14 is a vector showing the direction in which the heads 2a and 2b is moved, and an arrow 15 is a vector showing the direction in which the tape 1 is moved.

When the magnetic tape 1 is read at a high speed, the reproduction circuit 201 must always read out the tape position information 13 recorded on the magnetic tape 1. Referring to FIG. 2, in order to allow the reproduction circuit 201 to positively read out the tape position information 13 from the magnetic tape 1, the reproduction frequencies of the heads 2a and 2b must be kept constant or the reproduction circuit 201 must be arranged so that reproduction data may be read out even if the reproduction frequencies of the heads 2a and 2b change.

It is very difficult to arrange the reproduction circuit 201 so that the reproduction data may be read out even with the change of the reproduction frequencies of the heads 2a and 2b. To cope with this situation, it is necessary that the reproduction frequencies of the heads 2a and 2b be constant in order that the heads 2a and 2b can positively read out the tape position information 13 from the magnetic tape 1. In this connection, during reproduction, the component of speed at which the heads 2a and 2b are shifted in the direction of the tracks 12 (hereinafter referred to as the component of speed in the direction of the track) should be kept constant.

Figure 3:
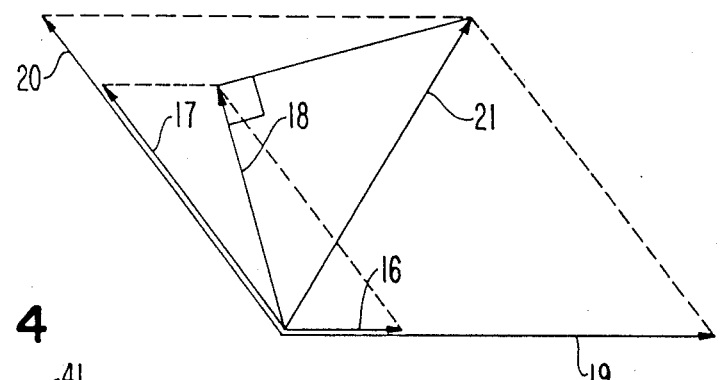
FIG. 3 is a diagram describing the condition for setting the rotational speed of the rotary cylinder in the first embodiment of the present invention.

FIG. 3 is a diagram describing the condition for enabling the component of speed of the heads 2a and 2b in the direction of track to remain constant. In the drawing, element 16 is a vector showing the travelling of the magnetic tape 1 during recording; element 17 is a vector showing the movement of the heads 2a and 2b during recording, and element 18 is a vector showing the relative movements of the heads 2a and 2b to the magnetic tape 1 during recording. The vector 18 is no doubt a vector composed of vectors 16 and 17 and will follow the direction of tracks 12 to be formed on the magnetic tape 1.

Furthermore, in FIG. 3, element 19 identifies a vector showing the magnetic tape 1 running at a high speed, element 20 is a vector showing the movement of the heads 2a and 2b urged by the rotation of the rotary cylinder 3 at a high speed, and element 21 is a vector showing the movement of the heads 2a and 2b relative to the magnetic tape 1 when it runs at a high speed. If the vector 20 is established in such a manner that the component of the vector 21 in the direction of the vector 18 will be equal to the magnitude of the vector 18, the component of speed of the heads 2a and 2b in the direction of track can be kept constant. In other words, it is preferrable that the rotational speed of the rotary cylinder 3 be set so that the component of the vector 21 in the direction of the vector 18 will be equal to the magnitude of the vector 18. This gives a desired rotational speed to the rotary cylinder 3.

With the provision of the rotational speed of the rotary cylinder 3 during recording, the speed of the magnetic tape upon recording, the diameter of the rotary cylinder 3, and the shifting tilt angle of the heads 2a and 2b to the magnetic tape 1, it is possible to calculate a desired rotational speed of the rotary cylinder 3 relative to the running speed of the magnetic tape 1. The desired rotational speed of the rotary cylinder 3 is given as a linear function of the running speed of the magnetic tape 1. With the DAT wherein the rotary cylinder 3 has a diameter of 30 mm, this may be expressed by the following formula:

$$N = 2000 + 5.13 \times (m-1) \text{ (rpm)}$$

wherein N is the desired rotational speed of the rotary cylinder and m is the ratio of the running speed of the magnetic tape 1 to the speed at the time of normal reproduction. The ratio m becomes minus when the magnetic tape 1 runs in reverse direction to that used during recording.

From the output of the tape speed detector 5, the cylinder speed setting unit 6 computes m of the above formula, and then N so as to output a desired rotational speed of the rotary cylinder 3. Specifically, this cylinder speed setting unit 6 can be easily embodied by a microcomputer.

Thus, the rotary cylinder is set to the rotational speed at which tape position information recorded on the magnetic tape 1 may be read out at any tape speed. Even if the running speed of the magnetic tape 1 changes, since the response time of the rotary cylinder 3 is considerably short as compared with that at the time when the magnetic tape 1 changes its running speed, the desired number of rotational speeds of the rotary cylinder 3 with respect to the magnetic tape 1 can be realized at all times, to ensure that the tape position information will be positively read out.

Figure 4:
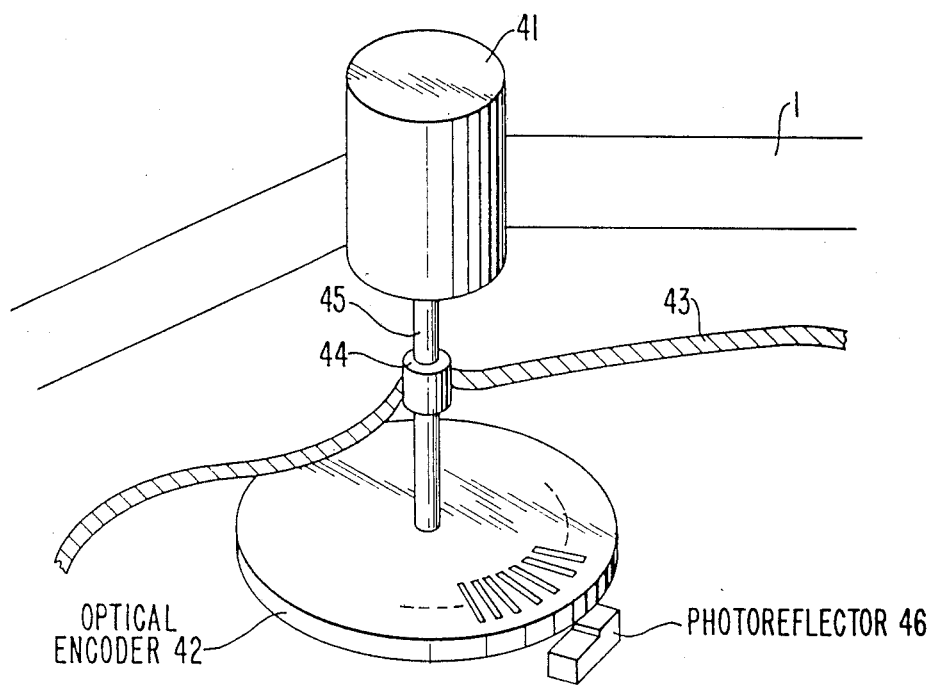
FIG. 4 is a diagram showing an example of the structure of the tape speed detecting unit in the first embodiment of the present invention.

FIG. 4 illustrates a concrete example of the tape speed detector. In this drawing, element 41 designates a roller adapted to rotate without slip in contact with the magnetic tape 1 and supported by a mechanical chassis 43 through a bearing 44; element 42 is an optical encoder secured to a shaft 45 on which the roller 41 is also mounted, and element 46 is a photoreflector for producing a signal in synchronization with the rotation of the optical encoder 42. In the arrangement of FIG. 4, the rotational angle of the optical encoder 42 can be obtained which is perfectly in accordance with the movement of the magnetic tape 1. That is, the running speed of the magnetic tape 1 is proportional to the angular speed of rotation of the optical encoder 42, and the photoreflector 46 produces a frequency signal whose frequency is in proportion to the running speed of the magnetic tape 1. Therefore, the use of the output of the photoreflector 46 permits easy detection of the running speed of the magnetic tape 1.

FIG. 4 shows an embodiment consisting of a combination of the optical encoder and the photoreflector. The optical encoder may be replaced by a magnet, and the photoreflector may be replaced by a hall element because such a replacement can achieve a similar function, whereby a variety of structure can be provided.

Figure 5:
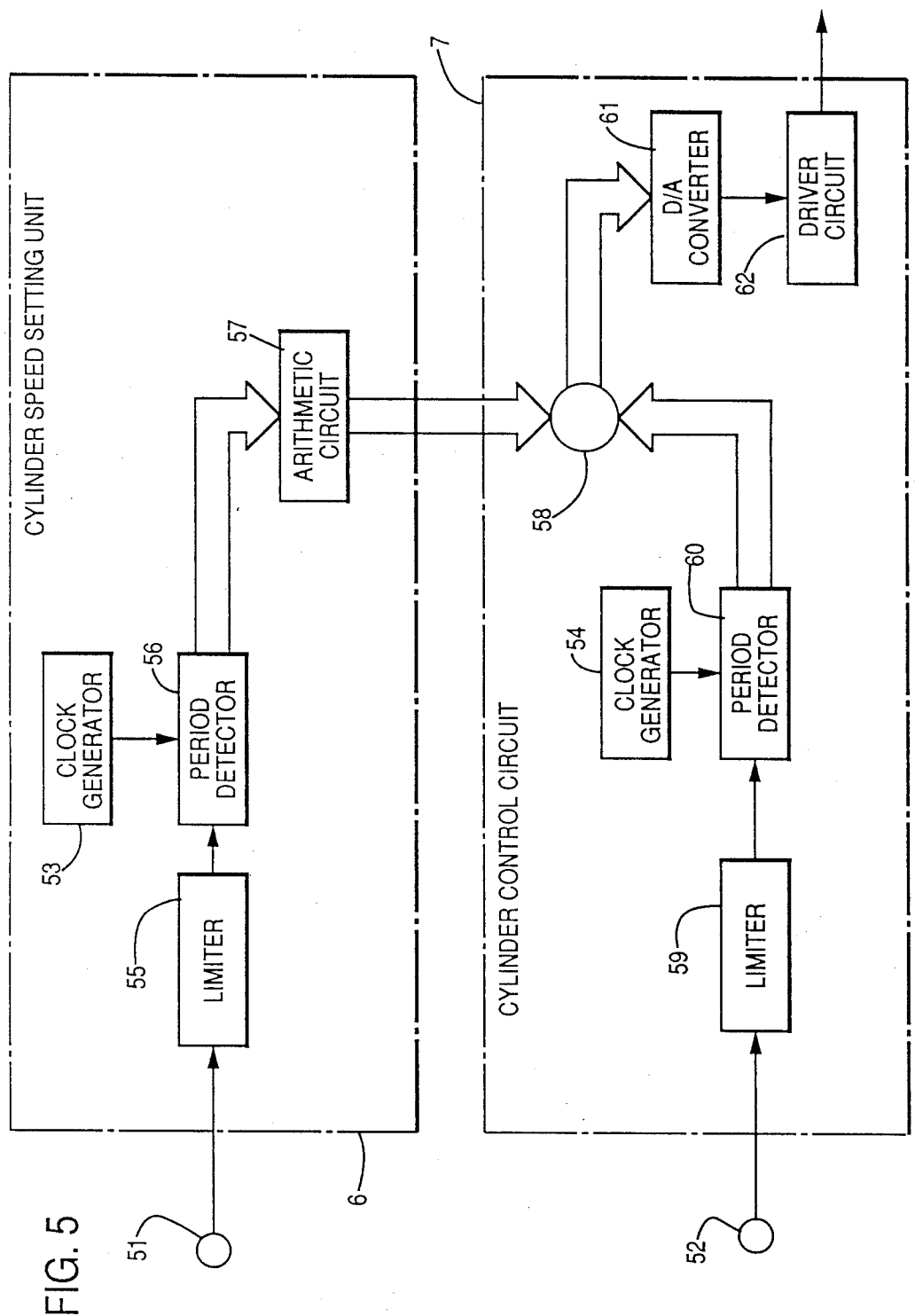
FIG. 5 is a block diagram showing an example of the combination of the cylinder speed setting unit and the cylinder control circuit in the first embodiment of the present invention.

FIG. 5 is a block diagram showing one concrete example of the structure of the cylinder speed setting unit 6 and cylinder control circuit 7. In the drawing, 51 is a terminal for inputting the output of the tape speed detector 5 as shown in FIG. 4; element 55 is a limiter for changing an output signal of the tape speed detector 5 which is inputted from the terminal 51, into a digital signal; element 53 is a clock generator; element 56 is a period detector circuit wherein the clock generated by the clock generator during the period of the output signal of the limiter 55 is counted to detect the period of the output signal of the limiter 55 and the detected period is outputted as a digital value, and element 57 is an arithmetic circuit for computing a desirable rotational speed of the rotary cylinder 3 from the output of the period detector circuit 56. The cylinder speed setting unit 6 is constituted by limiter 55, clock generator 53, period detector circuit 56, and arithmetic circuit 57. Furthermore, element 59 designates a limiter for changing an output signal of FG 11 of the rotary cylinder 3, which is inputted from the terminal 52, into a digital signal; element 54 is a clock generator; element 60 is a period detector circuit wherein the clock generated by the clock generator during the period of the output signal of the limiter 59 is counted to detect the period of the output signal of the limiter 59 and the detected period is outputted as a digital value; element 58 is a subtractor for subtracting the output of the arithmetic circuit from the output of the period detector circuit 60 on the base of digital data, and element 61 is a D/A converter for converting a digital output of the subtractor 58 into an analog signal, and element 62 is a driver circuit for applying electrical power to a motor for rotating the rotary cylinder 3 using the output of the D/A converter 61. The cylinder control circuit 7 is constituted by the limiter 59, clock generator 54, period detector circuit 60, subtracter 58, D/A converter 61, and driver circuit 62.

As described above, the structure constituted by the cylinder speed setting unit 6 and cylinder control circuit 7 allows the period detector circuit 56 to produce a binary digital signal in proportion to the period of the output of the tape speed detector 5. By dividing the output of the period detector circuit 56 by the output at the time of the tape running at a high speed, the ratio of the high speed running speed to the speed at the time of recording can be determined.

In a DAT provided with a rotary cylinder having a diameter of 30 mm, if the desirable rotational speed of the rotary cylinder 3 is N and the ratio of the running speed of the magnetic tape 1 to the speed at the time of recording is m, a formula is given as follows:

$$N = 2000 + 5.13 \times (m - 1) \text{ (rpm)}$$

The ratio m in the formula is obtainable by dividing the output of the period detector circuit 56 upon recording by the output at the time when the tape runs at a high speed. Such a division and calculation based on the above formula in the arithmetic circuit 57 can find a desirable N.

In FIG. 5, like the period detector circuit 56, the period detector circuit 60 similarly produces a period of an output signal of FG 11 mounted on the rotary cylinder 3 in the form of a binary digital signal.

When FG 11 outputs Z piece(s) of pulses per rotation, the following relationship is established between the desired velocity N of the rotary cylinder 3 and the cycle of FG 11.

$$T = 60/(N \cdot Z)$$

In the embodiment of FIG. 5, the arithmetic circuit 57 is constituted by a microcomputer so that the period T corresponding to the desirable rotational speed can be computed to form a binary digital signal. Hence, the difference between the desired period and the actual period of the output signal of FG 11 may be obtained in the form of a binary digital signal by means of the subtractor 58. By converting the output of the subtractor 58 into an analog signal using the D/A converter 61, the driver circuit 62 is driven to put the motor for the rotary cylinder 3 in motion. This regulates the rotary cylinder 3 to reduce the output of the subtractor 58 to zero, thus resulting in setting the rotary cylinder 3 to a desirable number of rotations.

Since the establishment of the rotational speed of the rotary cylinder 3 is always performed as the tape speed is being detected, the rotary cylinder 3 always rotates at a desirable speed even in a process where the tape speed changes. This ensures a positive read-out of the tape position information.

Though this embodiment uses the tape position information recorded in the initial portion of the track 12, it goes without saying that use of such information recorded on any other portion of the track 12 may achieve the specific effect in accordance with the present invention. The example of the tape speed detecting unit should not be restricted to the instant embodiment; various methods other than said embodiment can be considered. For example, particular frequency signals may be recorded on the tape by means of a fixed head during the time of recording and the recorded frequency signals reproduced at a time of reproduction so that the tape speed can be known from the reproduced frequency signal. The example of the arithmetic circuit 57 realized by the microcomputer was described, but a digital circuit can also be constituted by a multiplier, a divider, and a full adder in an easy manner, and the cylinder speed setting unit and cylinder control circuit should not be restricted in their structures to those of the embodiment.

As described above, in accordance with the present invention, the component of speed of the head in the direction of track may be kept constant even when the magnetic tape accelarates its speed, so that the information of tape position recorded on the magnetic tape can positively be read. For this reason, the operation takes place in such a manner that even in case of an abrupt change of running speed of the magnetic tape, i.e., from high speed to low speed or from low speed to high speed, positive read-out of tape position information recorded on the magnetic tape can be made in either process of increasing or decreasing of the tape speed. This avoids the necessity of providing many steps for the speed of the magnetic tape and rotary cylinder. As a result of that, system control programs of the microcomputer for providing speed instructions to the control circuit for the speed of magnetic tape and the speed of rotary cylinder can be simplified to a great extent.

Other embodiments of the present invention are described below.

Figure 6:
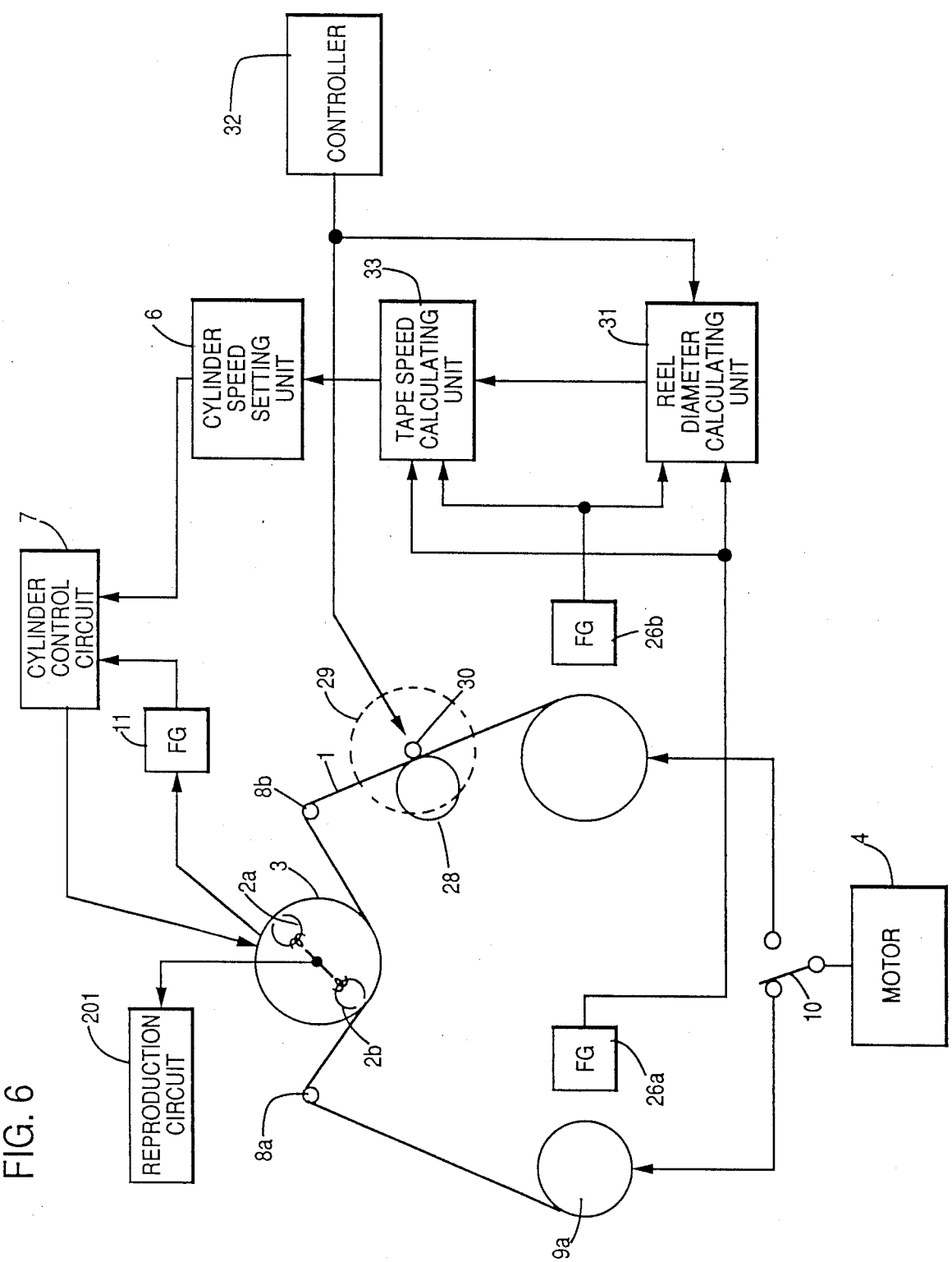
FIG. 6 is a block diagram of a second embodiment of the present invention.

FIG. 6 is a block diagram of a reproducing apparatus for magnetic tape of a second embodiment in accordance with the present invention. The same reference numbers will be applied to parts which are similar in function to those in the embodiment of FIG. 1. In FIG. 6, element 1 is a magnetic tape elements 2a and 2b are heads; element 3 is a rotary cylinder to which the heads 2a and 2b are secured; elements 9a and 9b reels for taking up the magnetic tape 1; elements 8a and 8b posts for forming a desired passageway for the magnetic tape 1 by bringing the tape into contact with the rotary cylinder 3; element 4 is a motor for driving the reel 9a or 9b to move the magnetic tape 1 at a high speed; element 10 is a driving force change-over unit for switching the driving force of the motor 4 to the reel 9a or 9b; elements 26a and 26b are reel FGs each mounted on the reels 9a and 9b for detecting the rotational speed of the reels 9a and 9b, element 32 is a controller, element 29 is a capstan motor; element 30 is a capstan shaft to which the capstan motor is also secured; element 28 is a pinch roller controlled by the controller 32 for its pressing against the capstan shaft; element 31 is a reel diameter calculating circuit for calculating through the output of the reel FGs 26a and 26b, the roll diameter of the magnetic tape wound around the reels 9a and 9b, while the pinch roller 28 is brought into contact with the capstan shaft 30 by the controller 32; element 33 is a tape speed calculating unit for calculating the running speed of the magnetic tape 1 by receiving the outputs of the reel FGs 26a and 26b and the reel diameter calculating circuit 31; element 6 is a cylinder speed setting unit for setting a desired rotational speed of the rotary cylinder 3 in view of the output of the tape speed calculating unit; element 11 is a FG for detecting and outputting the rotational speed of the rotary cylinder 3; element 7 is a cylinder control circuit for rotating the rotary cylinder 3 at the rotational speed outputted by the cylinder speed setting unit using the signal produced by FG 11, and element 201 is a reproduction circuit for reproducing a signal outputted from the heads 2a and 2b. The driving force changeover unit 10 specifically may be realized mechanically by a point-contact idler, and the controller 32 specifically may be constituted by a microcomputer.

The combination of the capstan motor 29, capstan shaft 30 and pinch roller 28 constitutes a low speed tape drive, and the combination of the motor 4 and driving force change-over unit 10 constitutes a high speed tape drive.

In FIG. 6, the capstan motor 29 runs at a substantially constant speed. The controller 32 produces a control signal for a determined period of time as needed, urging the pinch roller 28 into contact with the capstan shaft, and in the meanwhile, the controller 32 also urges the reel diameter calculating circuit 31 to make a calculation. That is to say, the magnetic tape runs at an almost constant speed while the controller 32 produces a control signal. If the tape speed is Vt, and the respective roll radiuses of reels 9a and 9b are r01 and r02, and the number of output pulses per one rotation of the reel FG is Z, and the frequencies of output signals of the reel FG 26a, 26b are f1, f2, then, $$r01 = \frac{Vts}{2\pi f1} \cdot Z$$

$$r01 = \frac{Vts}{2\pi f2} \cdot Z$$

This serves to calculate the reel diameter.

Next, the running of the magnetic tape at a high speed will be described. The magnetic tape is wound around the reel 9a or 9b by the rotary driving force generated by the motor 4 as it runs at a high speed. The running direction of the tape is changed by the driving force change-over unit 10. The reels 9a; 9b rotate in association with the movement of the magnetic tape 1, and the reel FGs 26a and 26b produce signals of frequencies in proportion to the rotational speed of the reels 9a and 9b. The reel diameter calculation circuit 31 acts to detect the roll diameter of the magnetic tape 1 taken up by the respective reels 9a and 9b as described above with consequential output of the detected roll diameter. The tape speed calculating unit 33 detects the running speed of the magnetic tape 1 in view of the output of the reel FGs 26a and 26b and the output of the reel diameter calculating circuit 31 and outputs the detected running speed. The following are expressions for this case.

If the actual roll diameter of the reel 9a is r1, and the actual roll diameter of the reel 9b is r2;
the roll diameter of the reel 9a outputted by the reel diameter calculating circuit 31 is r01;
the roll diameter of the reel 9b outputted by the reel diameter calculating circuit 31 is r02;
the frequency of an output signal of reel FG 9a is f1;
the frequency of an output signal of reel FG 9b is f2;
the number of output pulses per one rotation of the reel FG is Z, and
the tape speed is Vt, then $$F1 < Z \cdot Vt/2\pi r1, \, f2 = Z \cdot Vt/2\pi r2$$

and, $$\pi r01^2 + \pi r02^2 = \pi r1^2 + \pi r2^2$$

then, $$Vt = 2\pi f1 \, f2/Z \cdot r01^2 + r02^2/f1^2 + f2^2$$

The tape speed Vt is calculated by the above expressions and outputted as a digital value.

By use of the output of the tape speed calculating unit 33, the cylinder speed setting unit 6 is adapted to calculate and output a desired rotational speed of the rotary cylinder 3. Following the instructions of the cylinder speed setting unit 6, the cylinder control circuit 7 controls the rotational speed of the rotary cylinder 3 using the output of FG 11. The desired rotational speed of the rotary cylinder 3 outputted by the cylinder speed setting unit 6 is a value which in view of which the heads 2a and 2b can positively read out tape position information recorded on the magnetic tape 1.

As explained in the first embodiment, when the rotational speed of the rotary cylinder during recording, the speed of the magnetic tape 1 during recording, the diameter of the rotary cylinder, and the shifting tilt angle of the heads 2a and 2b with respect to the magnetic tape 1 are given, it is possible to calculate a desired rotational speed of the rotary cylinder 3 relative to the magnetic tape 1. The desired rotational speed of the rotary cylinder 3 is given as a direct function of the running speed of the magnetic tape 1. In the case of a DAT wherein the rotary cylinder 3 has a diameter of 30 mm, if the desired rotational speed of the rotary cylinder 3 is N, and the ratio of the running speed of the magnetic tape 1 to that at the time of recording is m, these are expressed by the following equation:

$$N = 2000 + 5.13 \times (m-1) \text{ (rpm)}$$

The ratio m is minus when the magnetic tape 1 runs in a reverse direction to the direction used during the recording.

The cylinder speed setting unit 6 calculates m of the above equation based on the output of the tape speed calculating unit 33 and then N so as to output a desired rotational speed of the rotary cylinder 3. Specifically, this cylinder speed setting unit 6 can easily be realized by a microcomputer.

Consequently, the rotary cylinder is set to a velocity at which information of tape position recorded on the magnetic tape 1 can be read out at any speed. Even if the running speed of the magnetic tape 1 changes, since the response time of the rotary cylinder 3 is very short as compared with that at the time of speed change, a desired velocity of the rotary cylinder 3 is always realized relative to the magnetic tape 1, to ensure that the of tape position information will positively be read out.

Figure 7:
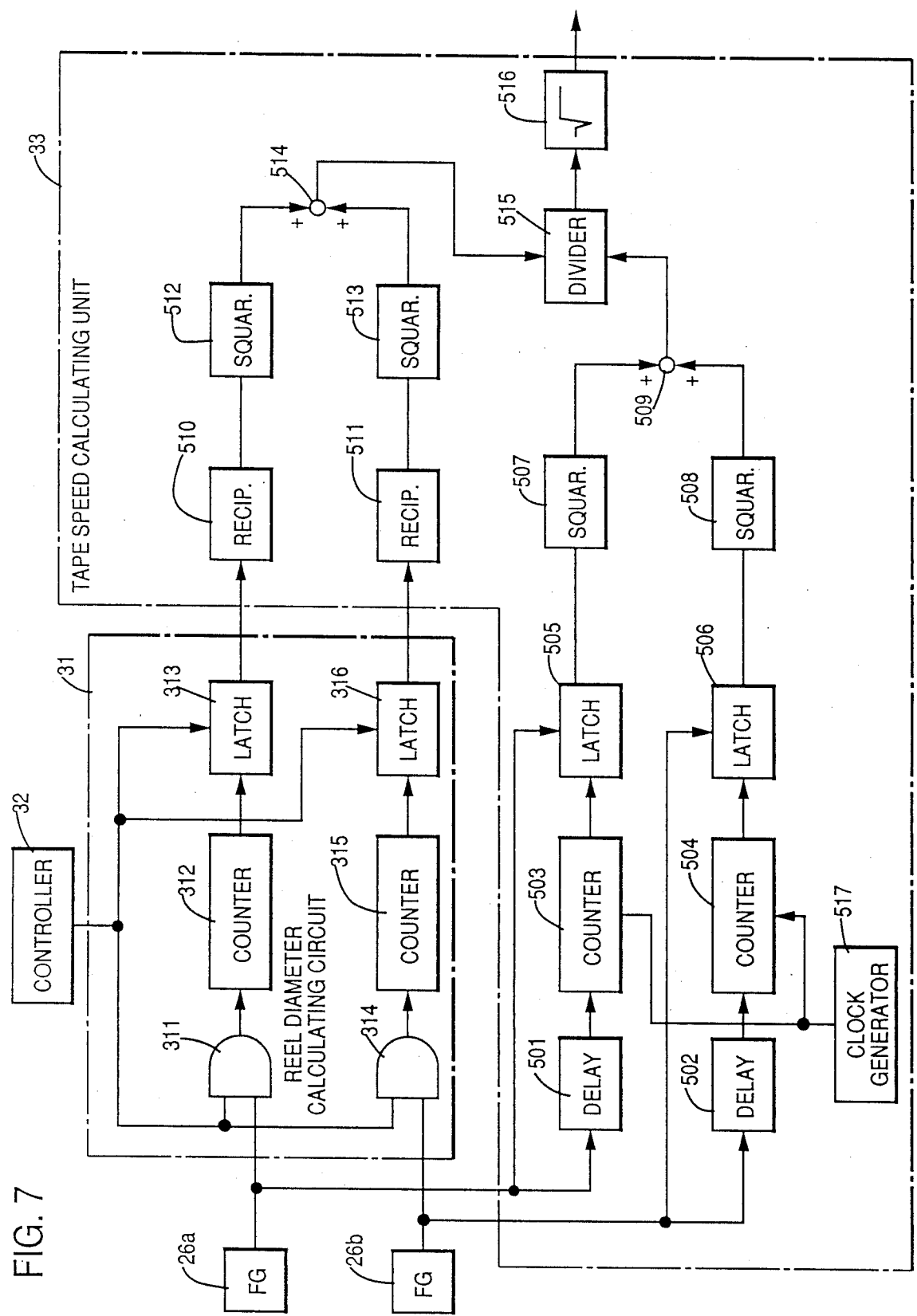
FIG. 7 is a block diagram of a third embodiment of the present invention.

FIG. 7 is a block diagram showing one concrete example of the reel diameter calculating circuit 3 and the tape speed calculating unit 33. In this drawing, only peripheral areas of the reel diameter calculating circuit 31 and the tape speed calculating unit 33 are shown with the other sections being omitted. The same reference numbers are applied to the elements which are similar in function to those in the embodiment of FIG. 6. FGs 26a and 26b are identical to those as described in FIG. 6.

Referring to FIG. 7, elements 311 and 314 are AND circuits for allowing the passage of the output of FGs 26a and 26b when the controller 32 produces a high-level control signal; elements 313 and 316 are latches for holding output data of the counters 312 315 when the control output of the controller 32 changes from a high level to a low level; elements 510 and 511 are reciprocal number circuits for taking a reciprocal number of output data of the latches 313, and 316; elements 512 and 513 are squaring circuits for squaring the respective outputs of the reciprocal number circuits 510 and 511; element 514 is an adder for determining a sum of the outputs of 512 and 513; elements 501 and 502 are delay circuits; elements 517 is a clock generator; elements 503 and 504 are counters for counting the clocks generated by the clock generator 517 after being reset by the output pulse of the delay circuits 501 and 502; elements 505 and 506 are latches for holding the output data of the counters 503 and 504 in synchronism with the output pulses of FGs 26a and 26b; elements 507 and 508 are second power circuits for squaring the respective output data of latches 505 and 506; element 509 is an adder for determining a sum of output data of the squaring circuits 507 and 508; element 515 is a divider for determining a ratio between output data of the adders 514 and 509, and element 516 is a square root circuit for determining the square root of the output of the divider 515.

It is noted that the above calculations are all carried out digitally.

The combination of AND circuits 311 and 314, counters 312, 315, and latches 313, 316 constitutes a reel diameter calculating circuit 31, and the combination of the reciprocal number circuits 510 and 511 the second power circuits 512 and 513, the delay circuits 501 and 502, the clock generator 517, counters 503 and 504, latches 505 and 506, the adders 514 and 509, divider 515, and the square root circuit 516 constitutes a tape speed calculating unit 33.

In FIG. 7, when the controller 32 outputs a high-level signal to the output terminal, the counters 312 and 315 are operative to count the output pulses of the FGs 26a and 26b via the AND circuits 311 and 314. Since the latches 313 and 316 latch the output data of the counters 312 and 315 at the leading edge of the output signal of the controller 32 and the numbers of pulses of FGs 26a, 26b generated during the time when the output signal of the controller 32 is maintained at a high level are held in the latches 313 and 316. Now that the period of time when the output signal of the controller 32 is at a high level is set to a certain value, if:

the roll diameter of the reel 9a is r01;
the roll diameter of the reel 9b is r02;
the data held by the latch 313 is D1;
the data held by the latch 316 is D2;
the number of output pulses per each rotation of the reel FG is Z;
the tape speed is Vts, and
the time when the output signal of the controller 32 is at a high level is T, then, $$D1 = \frac{Vts \cdot T}{2\pi r01} \cdot Z$$

$$D2 = \frac{Vts \cdot T}{2\pi r02} \cdot Z$$

The data is added by the adder 514 through the reciprocal number circuits 510 and 511 and the squaring circuits 512 and 513, and so the output data of the adder 514 is proportional to $(r01^2 + r02^2)/Vts^2$. The data is calculated only when the controller 32 produces a high-level output signal, but is kept otherwise.

In the meantime, irrespective of any signal outputted by the controller 32 and the counters 503, 504 are reset via the delay circuits 501 and 502 in synchronism with the output pulses of FGs 26a and 26b to count the pulse signal produced by the clock generator 517, latching on the latches 505 and 506 the counted value of the pulse signal produced by the clock generator 517. That is, on the latches 505 and 506 is latched the pulse-number generated by the clock generator during the respective cycles of the output signals of FGs 26a and 26b.

Then, if:

the roll diameter of the reel 9a is r1;
the roll diameter of the reel 9b is r2;
the data held by the latch 505 is d1;
the data held by the latch 506 is d2;
the output pulse-number per each rotation of the reel of the reel FG is Z;
the frequency of the signal generated by the clock generator is fc, and
the tape speed is Vt, then, $$d1 = \frac{fc}{Z \cdot \frac{Vt}{2\pi r1}}$$

$$d2 = \frac{fc}{Z \cdot \frac{Vt}{2\pi r2}}$$

Therefore, the data latched by the latches 505 and 506 are proportional to the roll diameters of the reels 9a and 9b.

Accordingly, the data generated by the adder 509 via the squaring circuits 507 and 508 is proportional to $(r1^1 + r2^2)/Vt^2$. The output by the divider 515 is expressed by the following formula.

$$\frac{(r01^2 + r02^2)}{(r1^2 + r2^2)} \cdot \frac{Vt^2}{Vts^2}$$

$(r01^2+r02^2)$ and $(r1^2+r2^2)$ are each a sum of the projected areas as seen from above the magnetic tape and tape hub, both values being substantially equal to each other. Therefore, the divider 515 outputs $Vt^2/Vts^2$, and the output of the square root circuit 516 will be Vt/Vts.

The running speed Vts of the magnetic tape at which the output of the controller 32 is at a high level is due to the driving of the capstan and which has a considerable degree of accuracy. As shown in FIG. 6, a direct drive of the reel by the motor 4 will cause its running speed to be inaccurate, but in the embodiment of FIG. 7, the tape speed can be determined based on Vts by means of the reel FGs 26a and 26b.

The cylinder speed setting unit 6 outputs a desired rotational speed of the rotary cylinder 3 based on the output of the tape speed calculating unit 33. Thus, the rotary cylinder 3 is set to a velocity at which information of tape position recorded on the magnetic tape 1 can be read out irrespective of the tape speed. Even when the running speed of the magnetic tape 1 changes, as the response time of the rotary cylinder 3 is very short as compared with the changing time of speed of the magnetic tape 1, a desired velocity of the rotary cylinder 3 relative to the magnetic tape 1 can always be realized to ensure that the positive read-out of tape position information will be achieved.

Figure 8:
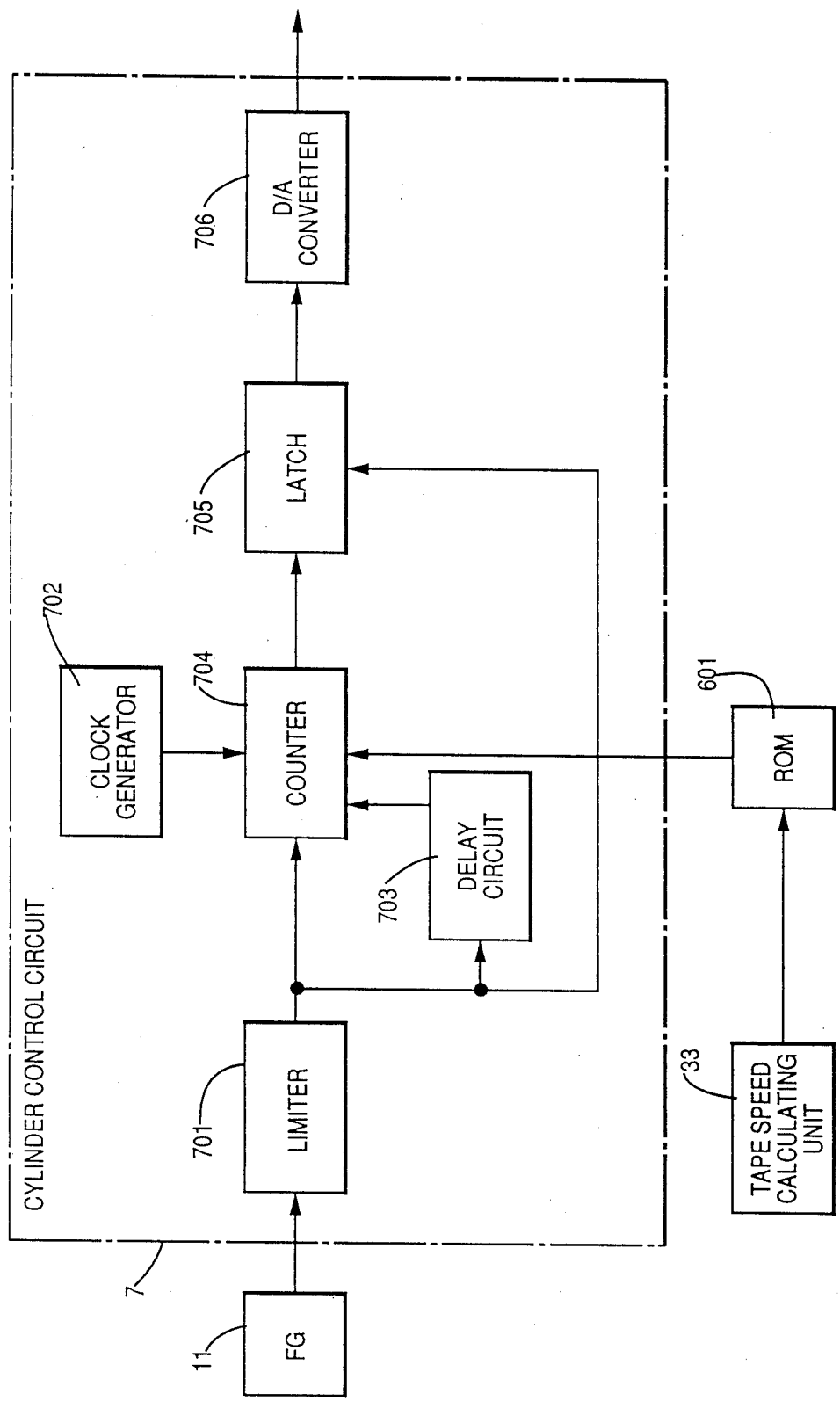
FIG. 8 is a block diagram of a fourth embodiment of the present invention.

FIG. 8 is a block diagram showing a concrete example of the cylinder speed setting unit 6 and cylinder control circuit 7. In the drawing, element 601 is a read-only memory (referred to as a ROM), in which is stored data that gives a velocity to the cylinder corresponding to the running speed of the magnetic tape 1. Element 701 is a limiter for forming the output of FG 11 into a rectangular wave; element 704 is a counter; element 702 is a clock generator; element 703 is a delay circuit; element 705 is a latch, and element 706 is a D/A converter.

The output signal of FG 11 is formed by the limiter 701. The counting value of the counter 704 is latched in the latch 705 at the leading edge (or trailing edge) of the output signal of the limiter 701, and then delayed by the delay circuit 703, and afterward the counter 704 is preset to the output data of ROM 601. Consequently, the data held by latch 705 is equal to a sum of value resulting from the division of the output signal cycle of FG 11 by the clock cycle of the clock generator 702 and output data of ROM 601. The output of the latch 705 is applied through D/A converter 706 to the drive circuit of the cylinder 3, which will put the cylinder into motion. The cylinder control circuit 7 has a control loop constituted so that the output of D/A converter will become constant, whereby the output data of the latch 705 remains constant at a stationary state. Therefore, the output signal cycle of FG 11 varies with the value produced by ROM 601. In other words, the velocity of the cylinder 3 is dependent on the output value of ROM. So ROM 601 is operative as cylinder speed setting unit 6.

By storing a desired velocity of the cylinder 3 in ROM 601 in response to data outputted by the tape speed calculating unit 33, the rotary cylinder 3 is always set to a velocity at which tape position information recorded on the magnetic tape 1 can be read out irrespective of tape speed. This always enables realization of a desired velocity of the rotary cylinder 3 relative to the magnetic tape 1 to ensure that positive read-out of tape position information will be achieved.

Figure 9:
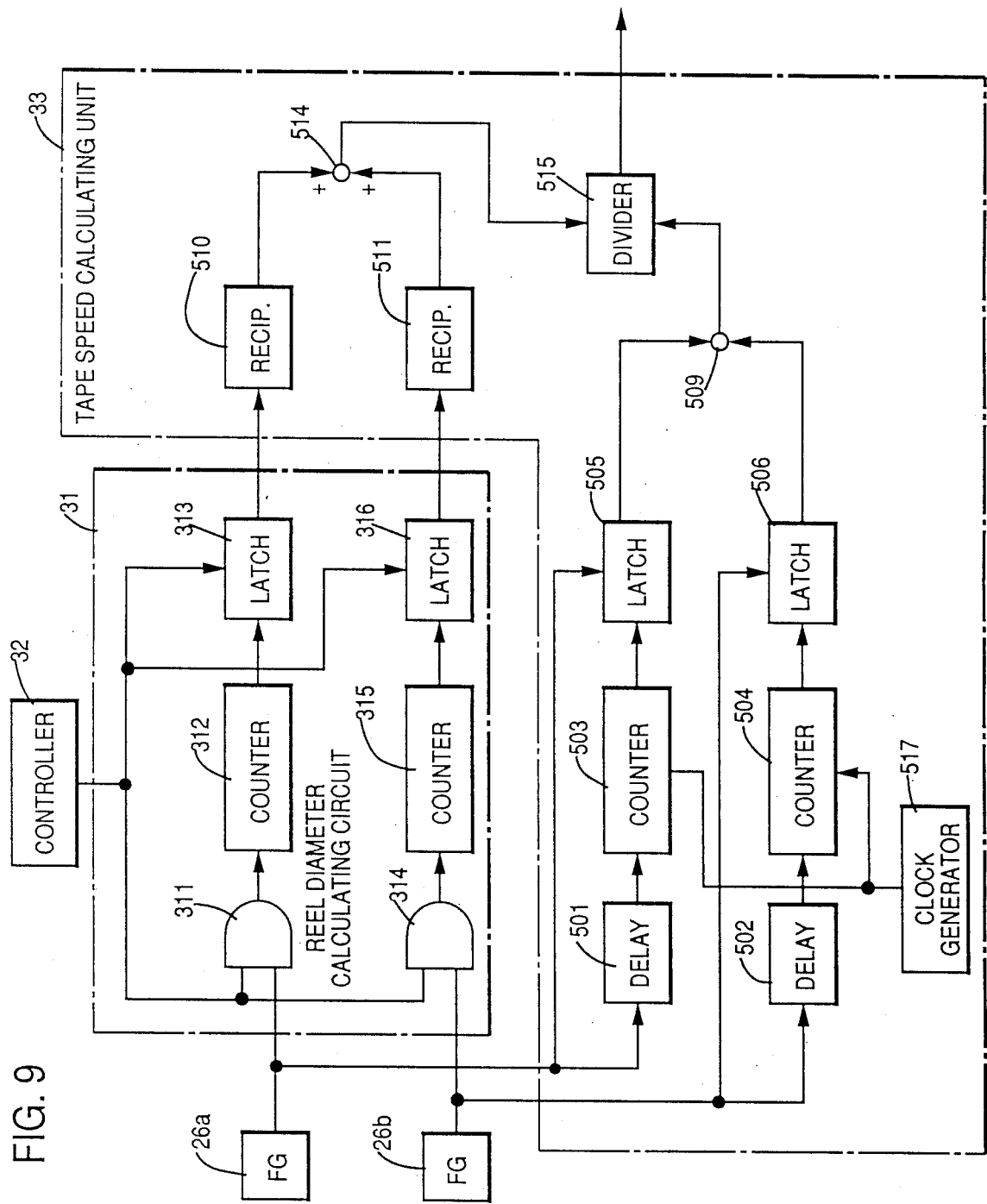
FIG. 9 is a block diagram of a fifth embodiment of the present invention.

FIG. 9 is a block diagram showing the second example of the reel diameter calculating circuit and the tape speed calculating unit. In the drawing are shown only reel diameter calculating circuit and tape speed calculating unit and their surroundings with other sections have been omitted. The same reference numbers are applied to the elements which have identical functions to those of the embodiment in FIG. 6. FGs 26a and 26b are also the same as those which have described with reference to FIG. 6. The reel diameter calculating circuit 31 as shown in FIG. 9 is indeed identical to the one as described with reference to FIG. 7 and a further explanation thereof will be omitted, accordingly. The tape speed calculating unit 33 is composed of reciprocal number circuits 510 and 511, adder 514, delay circuits 501 and 502, counters 503 and 504, clock generator 517, latches 505 and 506, adder 509, and divider 515, but exclusive of the square circuits 512, 513, 507 and 508 and the square root circuit 516 unlike the embodiment of FIG. 7. Provided the controller 32 outputs a high-level signal at the output terminal, and if, as the embodiment of FIG. 7, the roll diameter of the reel 9a is r01;
the roll diameter of the reel 9b is r01;
the data held by the latch 313 is D1;
the data held by the latch 316 is D2;
the output pulse-number per rotation of the reel of FG is Z;
the tape-speed is Vts; and the time when the output signal of the controller 32 is in a high level is T; then, $$D1 = \frac{Vts \cdot T}{2\pi r01} Z$$

$$D2 = \frac{Vts \cdot T}{2\pi r02} Z$$

Since the data is processed by the adder 514 via the reciprocal number circuits 510 and 511, the output data from the adder 514 is proportional to $(r01 + r02)/Vts$.

The data is calculated only when the controller 32 outputs a high-level output signal, and is kept unprocessed otherwise.

On the other hand, whatever output the controller 32 may produce, the counters 503 and 504 are reset via delay circuits 501 and 502 in synchronism with the output pulses of FGs 26a and 26b, to count output signals produced by the clock generator 517 and then to latch counted values of pulse signals produced by the clock generator 517 in the latches 505 and 506. That is, the latches 505, 506 hold the pulse-number generated by the clock generator during the respective cycles of output signals of FGs 26a and 26b. Then, if:

the roll diameter of the reel 9a is r1;
the roll diameter of the reel 9b is r2;
the data held by the latch 505 is d1;
the data held by the latch 506 is d2; the output pulse-number per rotation of the reel of reel FG is Z;
the frequency of a signal generated by the clock generator is fc, and the tape speed is Vt;
then, $$d1 = \frac{fc}{Z \cdot \frac{Vt}{2\pi r1}}$$

$$d2 = \frac{fc}{Z \cdot \frac{Vt}{2\pi r2}}$$

So, the data held by the latches 505 and 506 is proportional to the roll diameters of the reels 9a and 9b.

Thus, the data produced by the adder 509 is proportional to (r1+r2)/Vt. Therefore, the divider 515 will provide an output as follows:

$$\frac{(r01 + r02)}{(r1 + r2)} \cdot \frac{Vt}{Vts}$$

Both (r01$^2$+r0$^2$) and (r1$^2$+r2$^2$) are sums of the projected areas as seen from the upper surfaces of the magnetic tape wound around a reel and a reel of the tape hub, and are substantially equal to each other and constant values. Approximately, (r01+r02) and (r1+r2) are substantially equal to each other. Therefore, the output of the divider 515 is:

Vt/Vts.

The running speed Vts of the magnetic tape when the controller 32 produces a high-level output has a high degree of accuracy because the magnetic tape is fed by the capstan. As shown in FIG. 6, the direct drive of the reels by motor 4 causes the reels to run at an inaccurate speed, but the embodiment of FIG. 9 makes it possible to calculate the tape speed by aid of reel FGs 26a and 26b on the basis of Vts. The cylinder speed setting unit 6 outputs a desired velocity of the rotary cylinder 3 based on the output of the tape speed calculating unit 33.

The use of the embodiment of FIG. 9 and the cylinder control circuit 7 as shown in FIG. 8 can realize a substantial equivalent of the operation of the embodiment in FIG. 7.

Consequently, the rotary cylinder 3 is set to the velocity at which the information of tape position recorded on the magnetic tape can be read out at every tape speed. Even when the running speed of the magnetic tape 1 changes, since the response time of the rotary cylinder 3 is very short as compared with that during the time of speed change of the magnetic tape 1, the desired velocity of the rotary cylinder 3 relative to the magnetic tape 1 can always be realized to ensure that the tape position information will be read out positively.

The above-described embodiments utilize the tape position information recorded on the starting portion of the track 2, but tape position information recorded on any portion of the track 2 will achieve the same effect as that of the present invention.

In the above embodiments, reference was made to the tape-shaped recording medium as being a magnetic tape; however, the method of recording has nothing to do with the essential of the present invention, and so it goes without saying that any tape-shaped recording medium may be used irrespective of principle on which information is recorded.

What is claimed is:

1. An information reproducing apparatus for reproducing information from a tape-shaped recording medium on which positional information of the recording medium is recorded in each of a plurality of slant information tracks, which apparatus comprises:

heads for reading out recorded information;
a rotary cylinder on which said heads are mounted;
a reproducing means for reproducing information recorded on said recording medium via said heads;
two reels around which said recording medium is wound;
a high speed tape drive means for running said recording medium at a high speed as compared with the speed at the time of recording by use of said two reels;
a tape speed detecting means for continuously detecting the running speed of said recording medium;
a cylinder speed setting means for setting a target speed value of said rotary cylinder for making constant the component of the speed of the heads at which the heads move in a track direction of the information tracks according to an output of said tape speed detecting means; and
a cylinder control means for controlling said rotary cylinder so as to adapt its rotation to said target speed value of said rotary cylinder set by said cylinder speed setting means.

2. An apparatus as defined in claim 1, wherein the tape speed detecting means comprises an idler adapted to rotate in contact with said recording medium, and an encoder on a shaft to which said idler is also attached for producing an output in proportion to the rotational speed of the idler.

3. An apparatus as defined in claim 1, wherein the tape speed detecting means comprises:

a constant speed tape drive means for running said recording medium at a substantially constant speed;
two reel speed detectors for detecting the respective rotational speed of said two reels;
a controller for running said recording medium using said constant speed tape drive means for a predetermined period of time;
a reel diameter calculating means for calculating the reel diameter of said recording medium wound around the respective reels based on an output pulse of said respective reel speed detector during the time when said controller urges the said constant speed tape drive means to drive said recording medium; and a tape speed calculating means for calculating the running speed of said recording medium based on outputs of said reel speed detectors and said reel diameter calculation means when said high speed tape drive means drives said recording medium.

4. An apparatus as defined in claim 3, wherein said two reel speed detectors each include a pulse generator for producing pulses in proportion to the rotational speed of its reel as an output indicative of reel speed;

and wherein said reel diameter calculating means includes two counters for counting pulses generated by said two reel speed detectors for a predetermined period of time when said controller urges said constant speed tape drive means to run said recording medium, and wherein said tape speed calculating means comprises:

a reel square sum calculating circuit for calculating a sum of squares of the respective reciprocal numbers of the outputs of said two counters included in said reel diameter calculating means;

a pulse cycle square sum calculating circuit for calculating a sum of squares of the respective output pulse cycles of said two reel speed detectors when said high-speed tape drive means drives said recording medium;

a divider for calculating a ratio of outputs of said reel square sum calculating circuit and said pulse cycle square sum calculating circuit; and a square root circuit for taking a resultant square root of an output of said divider.

5. An apparatus as defined in claim 3, wherein said two reel speed detectors each include a pulse generator for generating pulses in proportion to the rotational speed of its reel as an output indicative reel speed;

and wherein said reel diameter calculating means includes two counters for counting pulses generated by said two reel speed detectors for a predetermined period of time when said controller urges said constant speed tape drive means to run said recording medium, and wherein said tape speed calculating means comprises:

a reel reciprocal number sum calculating circuit for calculating a sum of reciprocal numbers of outputs of said two counters included in said reel diameter calculating means;

a pulse cycle sum calculating circuit for calculating a sum of output pulse cycles of said two reel speed detectors when said high speed tape drive means drives said recording medium; and a divider for calculating a ratio of outputs of said reel reciprocal number sum calculating circuit and said pulse cycle sum calculating circuit.

* * * * *